United States Patent
Lou et al.

(10) Patent No.: US 11,242,108 B2
(45) Date of Patent: Feb. 8, 2022

(54) TURNING MECHANISM AND HANDLE

(71) Applicant: NINEBOT (BEIJING) TECH CO., LTD., Beijing (CN)

(72) Inventors: Yi Lou, Beijing (CN); Ji Lin, Beijing (CN); Xingle Li, Beijing (CN)

(73) Assignee: NINEBOT (BEIJING) TECH CO., LTD, Beijing (CN)

( * ) Notice: Subject to any disclaimer, the term of this patent is extended or adjusted under 35 U.S.C. 154(b) by 139 days.

(21) Appl. No.: 16/612,974

(22) PCT Filed: Sep. 11, 2017

(86) PCT No.: PCT/CN2017/101245
§ 371 (c)(1),
(2) Date: Nov. 12, 2019

(87) PCT Pub. No.: WO2018/209850
PCT Pub. Date: Nov. 22, 2018

(65) Prior Publication Data
US 2020/0164945 A1    May 28, 2020

(30) Foreign Application Priority Data
May 16, 2017   (CN) .......................... 201710342198.5

(51) Int. Cl.
*B62K 15/00*     (2006.01)
*B62K 21/26*     (2006.01)
(Continued)

(52) U.S. Cl.
CPC ............ *B62K 15/006* (2013.01); *B62K 3/002* (2013.01); *B62K 15/00* (2013.01); *F16C 11/103* (2013.01);
(Continued)

(58) Field of Classification Search
CPC ..... Y10T 403/32942; Y10T 403/32549; Y10T 403/32557; Y10T 403/32581;
(Continued)

(56) References Cited

FOREIGN PATENT DOCUMENTS

| CN | 101562771 A | 10/2009 |
|----|-------------|---------|
| CN | 201472565 U | 5/2010 |

(Continued)

OTHER PUBLICATIONS

Supplementary European Search Report in the European application No. 17909860.3, dated Apr. 6, 2020, 9 pgs.
(Continued)

*Primary Examiner* — Kevin Hurley
*Assistant Examiner* — Hosam Shabara
(74) *Attorney, Agent, or Firm* — Cooper Legal Group, LLC

(57) ABSTRACT

A turning mechanism and a handle. The turning mechanism comprises: a first connecting rod (201) and a second connecting rod (202); the first connecting rod (201) is provided with a first bevel end, the second connecting rod (202) is provided with a second bevel end, and the second bevel end matches with the first bevel end, so that the second connecting rod (202) rotates along the end face of the first bevel end; in the rotating process, the first bevel can be attached to the second bevel, so that no gap exists between the first connecting rod (201) and the second connecting rod (202).

10 Claims, 5 Drawing Sheets

(51) Int. Cl.
*B62K 3/00* (2006.01)
*F16C 11/10* (2006.01)
*B62K 17/00* (2006.01)

(52) U.S. Cl.
CPC .............. *B62K 17/00* (2013.01); *B62K 21/26* (2013.01); *B62K 2015/003* (2013.01); *B62K 2202/00* (2013.01)

(58) Field of Classification Search
CPC ..... Y10T 403/32591; Y10T 403/32213; Y10T 74/20792; Y10T 74/20798; Y10T 74/20804; Y10T 74/2081; Y10T 74/20816; B62K 15/00; B62K 15/006; B62K 21/26
USPC .................................................. 280/278, 287
See application file for complete search history.

(56) References Cited

FOREIGN PATENT DOCUMENTS

| | | | |
|---|---|---|---|
| CN | 203199117 U | 9/2013 | |
| CN | 204184530 U | 3/2015 | |
| CN | 205365934 U | 7/2016 | |
| CN | 106210454 A | 12/2016 | |
| CN | 106995029 A | 8/2017 | |
| CN | 206797584 U | 12/2017 | |
| DE | 202007009847 U1 | 11/2008 | |
| DE | 102012204909 A1 * | 10/2013 | ............. B62K 3/002 |
| DE | 102012204909 A1 | 10/2013 | |
| EP | 2477880 A1 | 7/2012 | |
| JP | 2003137162 A | 5/2003 | |
| KR | 100854018 B1 | 8/2008 | |
| KR | 100971651 B1 | 7/2010 | |
| WO | 2004108511 A2 | 12/2004 | |
| WO | 2011021132 A1 | 2/2011 | |
| WO | WO-2011021132 A1 * | 2/2011 | ............. B62K 21/26 |

OTHER PUBLICATIONS

International Search Report and English translation of the International Search Report in the international application No. PCT/CN2017/101245, dated Jan. 25, 2018, 6 pages.

Written Opinion and English translation of the Written Opinion of the International Search Authority in the international application No. PCT/CN2017/101245, dated Jan. 25, 2018, 9 pages.

* cited by examiner

TURNING MECHANISM AND HANDLE

CROSS-REFERENCE TO RELATED APPLICATIONS

The present application claims the priority of Chinese Patent Application No. 201710342198.5, filed with the State Intellectual Property Office of P. R. China on May 16, 2017, the title of which is "turning mechanism and handle", and the contents of which are hereby incorporated by reference in its entirety.

TECHNICAL FIELD

The present application relates to the technical field of structures, and particularly relates to a turning mechanism and a handle.

BACKGROUND

Foldable bicycles and foldable scooters may be manually folded or unfolded without the need of external tools during use. The foldable bicycles and the foldable scooters have the advantages of convenient carrying, smaller occupied space and the like, and have been widely seen in people's vision.

In order to realize the folding function of the foldable bicycles or the foldable scooters, a turning mechanism is usually disposed at a position such as a body or a handle. In the related art, a first connecting rod and a second connecting rod are provided with a rotating shaft, and the rotating shaft rotates in a plane space to realize the rotation of the second connecting rod. In this structure, gaps exist between the first connecting rod and the second connecting rod, and impurities easily enter into the gaps, so that the folding function of the vehicle is affected, and the user experience is very poor.

FIG. 1A is a structural diagram of a turning mechanism in the related art. The turning mechanism includes a first connecting rod 101, a second connecting rod 102 and a rotating shaft 103. The second connecting rod 102 may rotate along the rotating shaft 103. The rotation of the second connecting rod 102 is completed in a plane space. FIG. 1B is a state diagram of a turning mechanism in the related art after turning. As can be seen from FIG. 1A and FIG. 1B, gaps 104 exist in the turning mechanism.

Therefore, how to design a turning mechanism so that there is no gap between connecting rods becomes a technical problem that needs to be solved in the related art.

SUMMARY

In view of the above problems, the embodiments of the present application provide a turning mechanism and a handle to overcome the above problems or at least partially solve the above problems.

An embodiment of the present application provides a turning mechanism, including a first connecting rod and a second connecting rod. The first connecting rod is provided with a first bevel end, the second connecting rod is provided with a second bevel end, and the second bevel end is matched with the first bevel end, so that the second connecting rod rotates along an end surface of the first bevel end.

In any embodiment of the present application, the first bevel end and the second bevel end are provided with a rotating shaft, and the second connecting rod rotates along the first bevel end through the rotating shaft.

In any embodiment of the present application, the turning mechanism further includes a limiting mechanism configured to limit a rotation range of the second connecting rod.

In any embodiment of the present application, the limiting mechanism includes a first limiting block and a second limiting block, the first limiting block is fixed on the first bevel end, the second limiting block is fixed on the second bevel end, and when the second connecting rod rotates along the first bevel end, the first limiting block and the second limiting block are matched to limit the rotation range of the second connecting rod.

In any embodiment of the present application, the rotation range is from 0° to 180°.

In any embodiment of the present application, the turning mechanism further includes a fixing structure configured to fix the second connecting rod after a rotation of the second connecting rod is completed.

In any embodiment of the present application, a range of an included angle between the end surface of the first bevel end and the first connecting rod is from 15° to 75°

In any embodiment of the present application, the first connecting rod and the second connecting rod are in slot connection.

In any embodiment of the present application, a matching of the second bevel end and the first bevel end includes fitting of the second bevel end and the first bevel end.

In any embodiment of the present application, the end surface of the first bevel end is a flat surface, and an end surface of the second bevel end matched and connected with the first bevel end is a flat surface;

or the end surface of the first bevel end is a curved surface, and the end surface of the second bevel end matched and connected with the first bevel end is a curved surface.

An embodiment of the present application further provides a handle, including a handle rod and a grip. The handle rod is configured as the first connecting rod as described in any embodiment, and the grip is configured as the second connecting rod as described in any embodiment.

As can be seen from the above technical solutions, in the embodiments of the present application, the first connecting rod is provided with the first bevel end, the second connecting rod is provided with the second bevel end, and the second bevel end is matched and connected with the first bevel end, so that the second connecting rod rotates along the end surface of the first bevel end. In the rotating process, the first slope may be fit with the second slope, so that no gap exists between the first connecting rod and the second connecting rod.

BRIEF DESCRIPTION OF DRAWINGS

In order to more clearly illustrate the technical solutions in the embodiments of the present application or in the related art, the drawings required for description in the embodiments or the related art will be briefly described below. It is apparent that the drawings in the following description are only some embodiments recited in the embodiments of the present application. Those of ordinary skill in the art may also obtain other drawings according to these drawings.

DETAILED DESCRIPTION

In order to make the objectives, features and advantages of the embodiments of the present application more remarkable and easy to understand, the technical solutions in the embodiments of the present application are clearly and completely described below with reference to the drawings in the embodiments of the present application. It is apparent that the described embodiments are only a part of the embodiments of the present application, but are not all of the embodiments. Based on the embodiments in the present application, all other embodiments obtained by those skilled in the art without creative efforts fall within the protection scope of the embodiments of the present application.

The specific implementation of the embodiments of the present application is further described below with reference to the drawings of the embodiments of the present application.

In the embodiments of the present application, the first connecting rod is provided with the first bevel end, the second connecting rod is provided with the second bevel end, and the second bevel end is matched and connected with the first bevel end, so that the second connecting rod rotates along the end surface of the first bevel end. In the rotating process, the first bevel end may be fit with the second bevel end, so that no gap exists between the first connecting rod and the second connecting rod.

Of course, any one of the technical solutions implementing the embodiments of the present application does not necessarily have to achieve all of the above advantages at the same time.

In order to enable those skilled in the art to better understand the technical solutions in the embodiments of the present application, the technical solutions in the embodiments of the present application are clearly and completely described below with reference to the drawings in the embodiments of the present application. It is apparent that the described embodiments are only a part of the embodiments of the present application, but are not all of the embodiments. Based on the embodiments in the present application, all other embodiments obtained by those skilled in the art should fall within the protection scope of the embodiments of the present application.

The specific implementation of the embodiments of the present application is further described below with reference to the drawings of the embodiments of the present application.

Figure 1A:
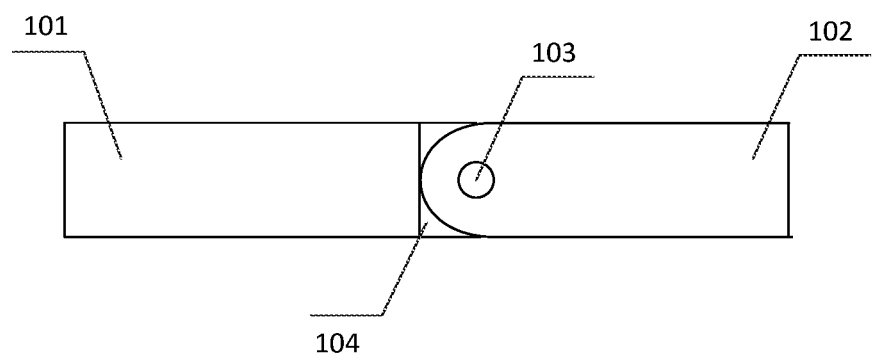
FIG. 1A is a structural diagram of a turning mechanism in the related art.
Figure 1B:
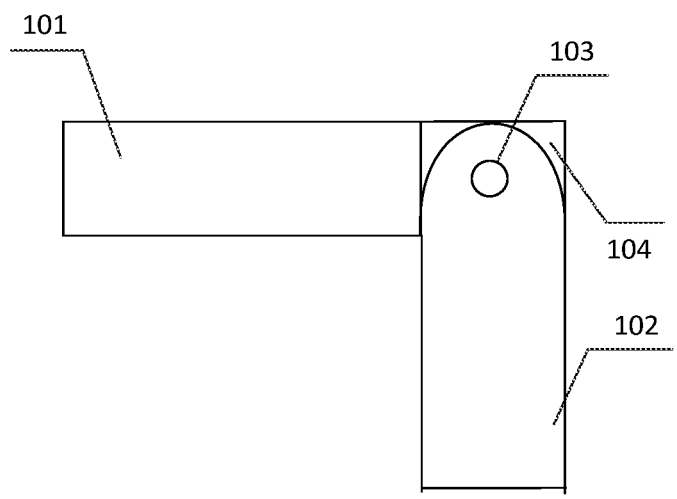
FIG. 1B is a state diagram of a turning mechanism in the related art after turning.
Figure 2A:
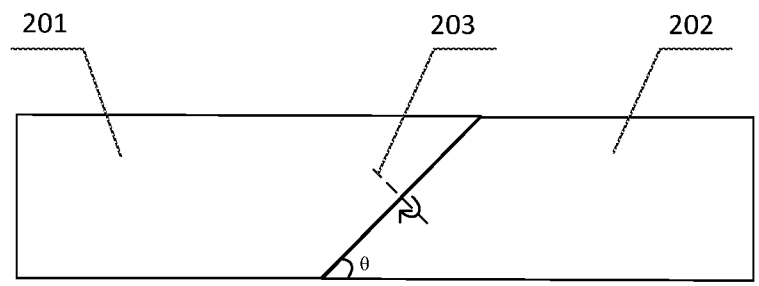
FIG. 2A is a schematic diagram of a turning mechanism of the present application.

Referring to FIG. 2A, in a specific embodiment of the present application, the turning mechanism includes a first connecting rod 201 and a second connecting rod 202.

The first connecting rod 201 is provided with a first bevel end (not marked in the drawings), the second connecting rod 202 is provided with a second bevel end (not marked in the drawings), and the second bevel end is matched with the first bevel end, so that the second connecting rod 202 may rotate along the first bevel end. Alternatively, in another embodiment, the first connecting rod 201 may rotate along an end surface of the second bevel end.

In an exemplary example, an axial line 203 of the second connecting rod 202 is perpendicular to the first bevel end when the second connecting rod rotates along the first bevel end.

In an exemplary example, the second bevel end may be in fitting contact with the first bevel end.

In an exemplary example, the end surface of the first bevel end is a flat surface, and correspondingly, the end surface of the second bevel end matched with the first bevel end is also a flat surface. In the mechanism, both the end surfaces of the first bevel end and the second bevel end are flat surfaces, so that no gap exists between the first connecting rod and the second connecting rod.

In an exemplary example, the end surface of the first bevel end may also be a first curved surface, and correspondingly, the end surface of the second bevel end matched with the first bevel end may also be a second curved surface. The shapes of the second curved surface and the first curved surface are not specifically limited as long as no gap exists between the first connecting rod and the second connecting rod in the rotating process of the second connecting rod or the first connecting rod.

In an exemplary example, the turning mechanism also includes a fixing structure (not shown) configured to fix the second connecting rod after the rotation of the second connecting rod is completed.

In an exemplary example, if the end surface of the first bevel end is a flat surface, the range of an included angle θ (inclination angle of the flat surface) between the end surface of the first bevel end and the horizontal center line of the first connecting rod 201 is from 15° to 75°, preferably 30° to 60°, such as 45° or 50°.

In an exemplary example, each of the first connecting rod 201 and the second connecting rod 202 is of a hollow structure, and the hollow structure may save the consumable of the turning mechanism and reduce the weight of the turning mechanism.

Figure 2B:
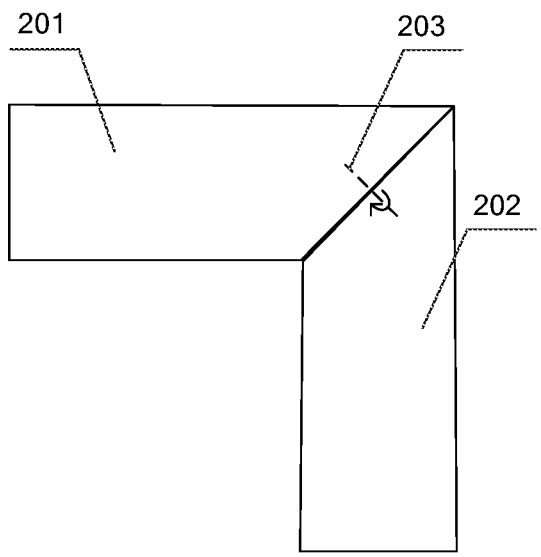
FIG. 2B is a schematic diagram of a turning mechanism of the present application after rotating.

FIG. 2B is a state diagram of a turning mechanism of the present application after turning. As shown, after the second connecting rod 202 is turned by 90° along the axial line 203, the second connecting rod 202 is folded toward the first connecting rod 201. In the rotating process, the second connecting rod rotates in a three-dimensional space. In the rotating process, the first bevel end and the second bevel end can be in fitting and can rotate.

In the present embodiment, the first connecting rod is provided with the first bevel end, the second connecting rod is provided with the second bevel end, and the second bevel end is matched and connected with the first bevel end, so that the second connecting rod rotates along the end surface of the first bevel end. In the rotating process, the first bevel end may be fit with the second bevel end, so that no gap exists between the first connecting rod and the second connecting rod.

Figure 3A:
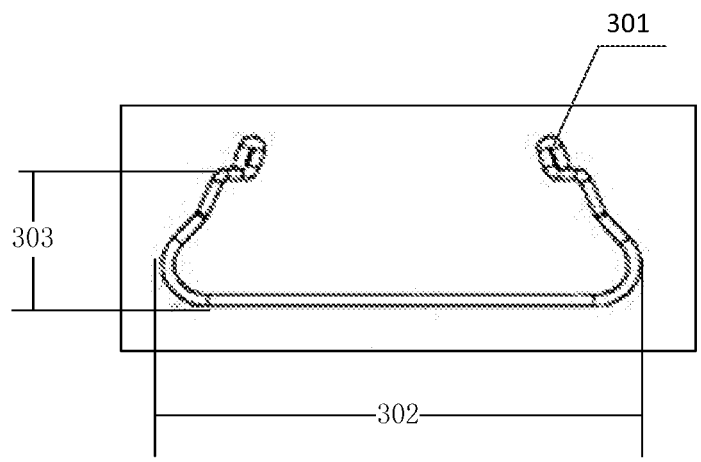
FIG. 3A is a schematic diagram of a longitudinal section of an inner rail of a slot in a turning mechanism of the present application.
Figure 3B:
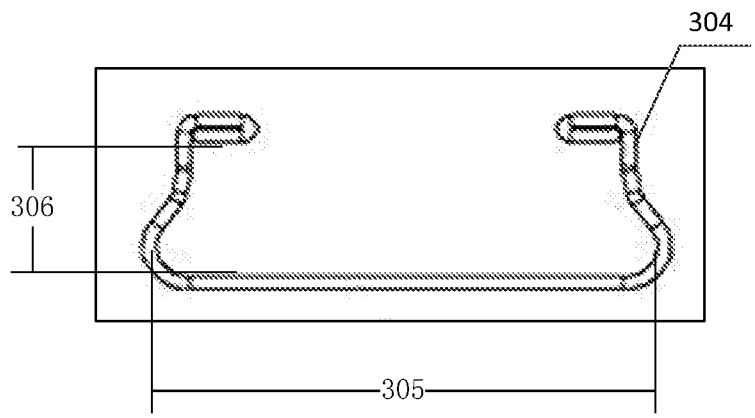
FIG. 3B is a schematic diagram of a longitudinal section of an outer rail of a slot in a turning mechanism of the present application.
Figure 3C:
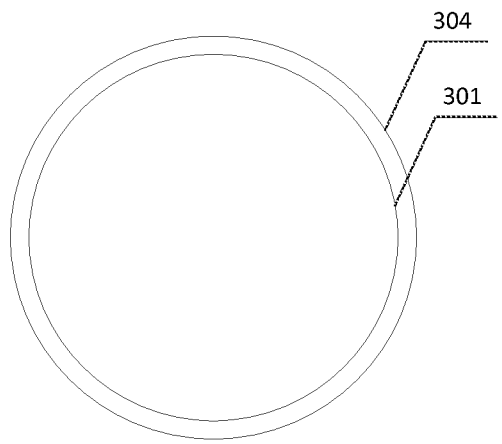
FIG. 3C is a schematic diagram of an overlooking structure of a slot in a turning mechanism of the present application.

In another specific embodiment of the present application, the first connecting rod and the second connecting rod are in slot connection. FIG. 3A is a schematic diagram of a longitudinal section of an inner rail of a slot in a turning mechanism of an embodiment of the present application. FIG. 3B is a schematic diagram of a longitudinal section of an outer rail of a slot in a turning mechanism of an embodiment of the present application. FIG. 3C is a schematic diagram of an overlooking structure of a slot in a turning mechanism of an embodiment of the present application.

Referring to FIG. 3A to FIG. 3C, in the present embodiment, an outside length 302 of an inner rail 301 is less than an inside length 305 of an outer rail 304, and an outside shoulder height 303 of the inner rail 301 is less than an inside shoulder height 306 of the outer rail 304, so that the inner rail 301 can be embedded into the outer rail 304.

In an exemplary example, the inner rail 301 may be disposed on the first bevel end of the first connecting rod, and the outer rail 304 may be disposed on the second bevel end of the second connecting rod.

In an exemplary example, the slot is an annular slot. The slot in the present embodiment is configured as the annular slot to realize rotation of the second connecting rod along the end surface of the first bevel end. The present embodiment simplifies the structure of the turning mechanism.

The slot in the present embodiment may also include a bearing to support the rotation of the second connecting rod. The bearing may reduce the friction coefficient of the second connecting rod in the rotating process and may ensure the accuracy in the rotating process.

Figure 4A:
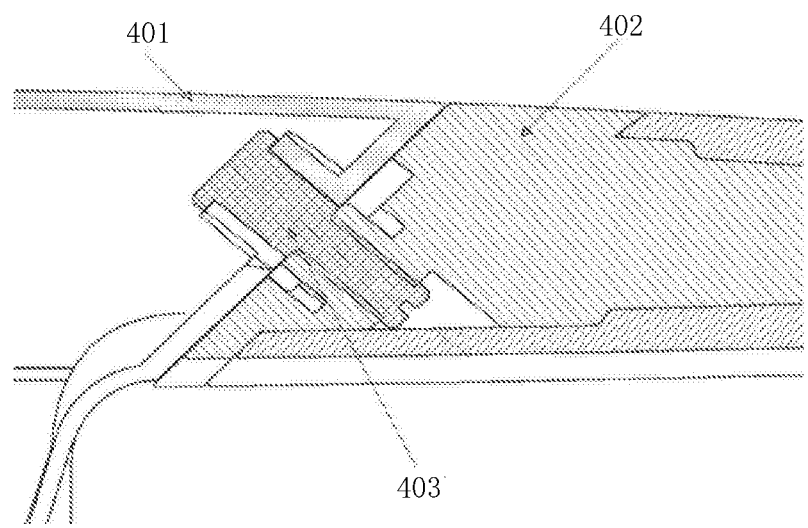
FIG. 4A is a structure schematic diagram of another turning mechanism of the present application.

Referring to FIG. 4A, in another specific embodiment of the present application, the turning mechanism includes a first connecting rod 401, a second connecting rod 402 and a rotating shaft 403.

The first connecting rod 401 is provided with a first bevel end (not marked in the drawings), the second connecting rod 402 is provided with a second bevel end (not marked in the drawings), the second bevel end is connected with the first bevel end through the rotating shaft 403, and the second connecting rod 402 may rotate along the end surface of the first bevel end through the rotating shaft 403.

In an exemplary example, one end of the rotating shaft may be fixed on the first bevel end, and the other end of the rotating shaft may be fixed on the second bevel end, so that the second connecting rod rotates relative to the first connecting rod. Alternatively, in other embodiments, the first connecting rod rotates relative to the second connecting rod.

Figure 4B:
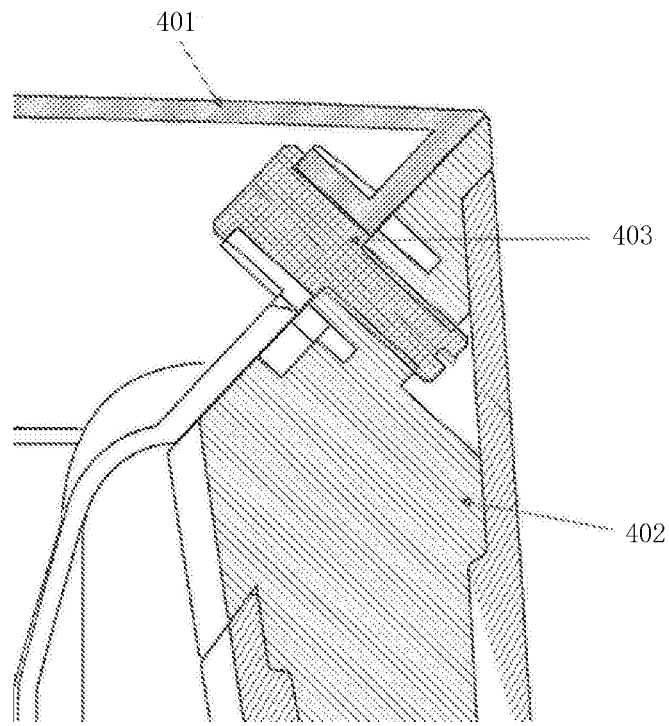
FIG. 4B is a structure schematic diagram of another turning mechanism of the present application after rotating.

FIG. 4B is a state diagram of another turning mechanism of the present application after rotating. As shown in FIG. 4B, after the second connecting rod 402 in FIG. 4A is turned by 90° along an axial line (not shown), the second connecting rod 402 is folded toward the first connecting rod 401. In the rotating process, the first bevel end and the second bevel end may be in a fitting state, so that no gap exists between the second connecting rod 402 and the first connecting rod 401.

In the present embodiment, the rotating shaft is disposed between the first bevel end and the second bevel end, so that the second connecting rod rotates relative to the first connecting rod. The present embodiment may increase the flexibility of the turning mechanism.

Figure 5A:
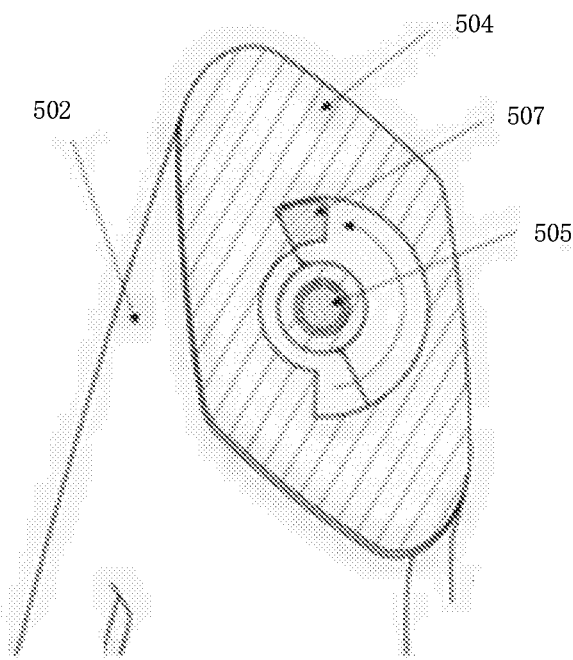
FIG. 5A is a structure schematic diagram of a second connecting rod in a turning mechanism of the present application.
Figure 5B:
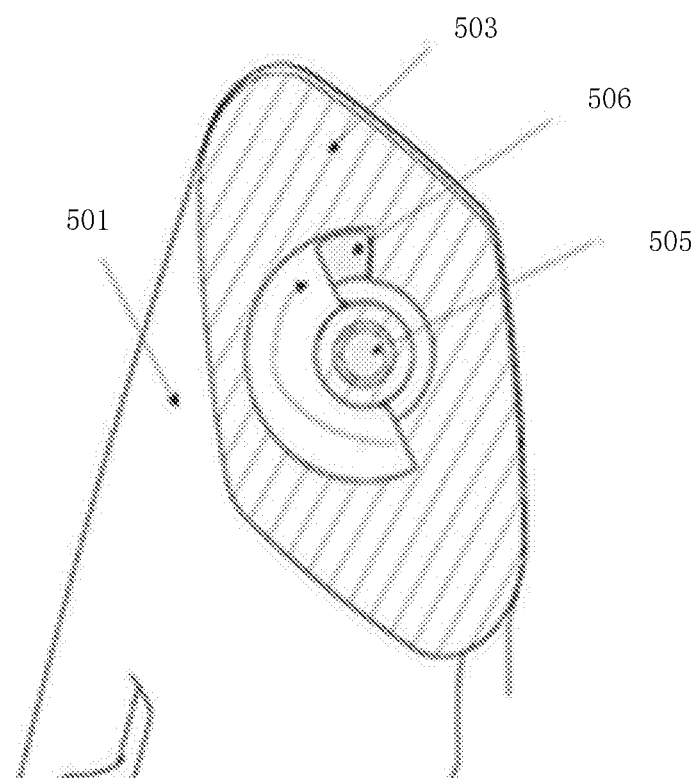
FIG. 5B is a structure schematic diagram of a first connecting rod in a turning mechanism of the present application.

Referring to FIG. 5A and FIG. 5B, in another specific embodiment of the present application, the turning mechanism includes a first connecting rod 501, a second connecting rod 502, a rotating shaft 505, a first limiting block 506 and a second limiting block 507.

In an exemplary example, the first limiting block 506 and the second limiting block 507 constitute a limiting mechanism configured to limit the rotation range of the second connecting rod 502. Alternatively, in another embodiment, the limiting mechanism may also limit the rotation of the first connecting rod 501.

In an exemplary example, the first limiting block 506 is fixed on the first bevel end 503, and the second limiting block 507 is fixed on the second bevel end 504. When the second connecting rod 502 needs to be unfolded, a user manually operates the second connecting rod 502 to enable the second connecting rod 502 to rotate along the end surface of the first bevel end 503, and the second bevel end 504 is driven by the second connecting rod 502 to synchronously rotate, so that the second limiting block 507 is driven to synchronously rotate to one end of the first limiting block 506 and is matched with the first limiting block 506 to play a role of limiting the rotation range of the second limiting block 507. The rotation range may be controlled by the setting position of the first limiting block 506 on the first bevel end 503, or controlled by the setting position of the second limiting block 507 on the second bevel end 504. In a specific embodiment, the second limiting block 507 may be a bulge, the first limiting block 506 may be a recess structure or a gap structure, and the bulge is clamped with the recess or the gap to limit the rotation range, that is, the bulge structure moves in the recess structure or the gap structure to play a role of limiting.

When the second connecting rod 502 needs to be folded, the user manually operates the second connecting rod 502 to enable the second connecting rod 502 to rotate along the end surface of the first bevel end 503 (the rotation direction is opposite to the rotation direction during unfolding and may also be the same with the rotation direction during unfolding, that is, when the second connecting rod 502 is unfolded and folded, the second connecting rod 502 is rotated for half a circle, rotated for a circle from the unfolding position to the unfolding position again, and rotated for a circle from the folding position to the folding position again), and the second bevel end 504 is driven by the second connecting rod 502 to synchronously rotate, so that the second limiting block 507 is driven to synchronously rotate to the other end of the first limiting block 506 and is matched with the first limiting block 506 to play a role of limiting the rotation range of the second limiting block 507.

In an exemplary example, the rotation range of the rotating shaft is from 0° to 180°.

In an exemplary example, the turning mechanism also includes a fixing structure (not shown) configured to fix the second connecting rod after the unfolding of the second connecting rod is completed. In an example, the fixing structure may include a pin and an insertion hole, the pin is disposed on the first connecting rod, and the insertion hole is disposed on the second connecting rod. After the second connecting rod is unfolded, the pin is penetrated into the insertion hole to realize the fixation of the second connecting rod. Similarly, a similar fixing structure may also be adopted to fix the second connecting rod after the folding of the second connecting rod is completed.

An embodiment of the present application provides a handle, including a handle rod and a grip. The handle rod is configured as the first connecting rod in the turning mechanism of any one of the above embodiments, and the grip is configured as the second connecting rod in the turning mechanism of any one of the above embodiments.

It should be noted that in the above embodiments, the connection described in the above embodiments may be physical connection or physical contact between components.

Although exemplary embodiments of the embodiments of the present application have been described, additional changes and modifications to these embodiments may be made by those skilled in the art once the basic creative concept is known. Therefore, the appended claims are intended to be interpreted as including the exemplary embodiments and all changes and modifications that fall within the scope of the embodiments of the present application. It is apparent that those skilled in the art may make various changes and modifications to the embodiments of the present application without departing from the spirit and scope of the embodiments of the present application. Thus, if these changes and modifications of the embodiments of the present application fall within the scope of the claims of the embodiments of the present application and equivalent technologies thereof, the embodiments of the present application are also intended to include these changes and modifications.

It should be noted that in the above embodiments, the connection described in the above embodiments may be physical connection or physical contact between components. Finally, it should be noted that the above embodiments are only configured to illustrate the technical solutions of the embodiments of the present application, and are not limited thereto. Although the embodiments of the present application are described in detail with reference to the above embodiments, it should be understood by those skilled in the art that the technical solutions recited in the above embodiments may be modified, or some of the technical features may be equivalently replaced. However, the essence of the corresponding technical solutions does not depart from the spirit and scope of the technical solutions of the embodiments of the present application due to these modifications or replacements.

The invention claimed is:

1. A turning mechanism, comprising a first connecting rod and a second connecting rod,
    wherein the first connecting rod is provided with a first bevel end, the second connecting rod is provided with a second bevel end, and the second bevel end is matched with the first bevel end, so that the second connecting rod rotates along an end surface of the first bevel end,
    the first connecting rod and the second connecting rod are in slot connection, the slot connection comprises an inner rail disposed on the first bevel end of the first connecting rod and an outer rail disposed on the second bevel end of the second connecting rod, an outside length of the inner rail is less than an inside length of the outer rail, and an outside shoulder height of the inner rail is less than an inside shoulder height of the outer rail, so that the inner rail is embedded into the outer rail.

2. The turning mechanism of claim 1, further comprising a fixing structure configured to fix the second connecting rod after a rotation of the second connecting rod is completed.

3. The turning mechanism of claim 1, wherein a range of an included angle between the end surface of the first bevel end and the first connecting rod is from 15° to 75°.

4. The turning mechanism of claim 1, wherein a matching of the second bevel end and the first bevel end comprises fitting of the second bevel end and the first bevel end.

5. The turning mechanism of claim 1, wherein the end surface of the first bevel end is a flat surface, and an end surface of the second bevel end matched and connected with the first bevel end is a flat surface;
    or the end surface of the first bevel end is a curved surface, and the end surface of the second bevel end matched and connected with the first bevel end is a curved surface.

6. The turning mechanism of claim 1, wherein an axial line of the second connecting rod is perpendicular to the first bevel end when the second connecting rod rotates along the first bevel end.

7. A handle, comprising a handle rod and a grip, wherein the handle rod is configured as a first connecting rod, and the grip is configured as a second connecting rod,
    the first connecting rod is provided with a first bevel end, the second connecting rod is provided with a second bevel end, and the second bevel end is matched with the first bevel end, so that the second connecting rod rotates along an end surface of the first bevel end,
    the first connecting rod and the second connecting rod are in slot connection, the slot connection comprises an inner rail disposed on the first bevel end of the first connecting rod and an outer rail disposed on the second bevel end of the second connecting rod, an outside length of the inner rail is less than an inside length of the outer rail, and an outside shoulder height of the inner rail is less than an inside shoulder height of the outer rail, so that the inner rail is embedded into the outer rail.

8. The handle of claim 7, wherein a range of an included angle between the end surface of the first bevel end and the first connecting rod is from 15° to 75°.

9. The handle of claim 7, wherein a matching of the second bevel end and the first bevel end comprises fitting of the second bevel end and the first bevel end.

10. The handle of claim 7, wherein the end surface of the first bevel end is a flat surface, and an end surface of the second bevel end matched and connected with the first bevel end is a flat surface;
    or the end surface of the first bevel end is a curved surface, and the end surface of the second bevel end matched and connected with the first bevel end is a curved surface.

* * * * *